(12) United States Patent
Wirth

(10) Patent No.: US 8,572,949 B2
(45) Date of Patent: Nov. 5, 2013

(54) FLOW GUIDE DEVICE AS WELL AS EXHAUST SYSTEM EQUIPPED THEREWITH

(75) Inventor: Georg Wirth, Kirchheim/Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 810 days.

(21) Appl. No.: 12/178,075

(22) Filed: Jul. 23, 2008

(65) Prior Publication Data

US 2009/0025392 A1    Jan. 29, 2009

(30) Foreign Application Priority Data

Jul. 25, 2007   (DE) .................. 10 2007 035 226

(51) Int. Cl.
*F01N 13/08*  (2010.01)
*F01N 3/26*   (2006.01)

(52) U.S. Cl.
USPC ............. 60/286; 60/295; 60/303; 60/309; 60/324; 181/269; 48/189.4

(58) Field of Classification Search
USPC ............ 60/286, 295, 303, 309, 324; 181/269; 48/189.4
See application file for complete search history.

(56) References Cited

U.S. PATENT DOCUMENTS

| | | | |
|---|---|---|---|
| 2,268,386 A * | 12/1941 | Fisher | 165/161 |
| 2,717,049 A * | 9/1955 | Langford | 96/377 |
| 3,902,094 A * | 8/1975 | Scott, Jr. | 313/348 |
| 3,964,875 A * | 6/1976 | Chang et al. | 422/176 |
| 4,183,896 A * | 1/1980 | Gordon | 422/168 |
| 4,255,124 A * | 3/1981 | Baranowski, Jr. | 431/353 |
| 4,971,768 A | 11/1990 | Ealba et al. | |
| 5,110,560 A | 5/1992 | Presz, Jr. et al. | |
| 5,727,398 A * | 3/1998 | Phillippe | 62/503 |
| 6,536,420 B1 * | 3/2003 | Cheng | 123/590 |
| 2002/0110047 A1* | 8/2002 | Bruck et al. | 366/340 |
| 2003/0226539 A1* | 12/2003 | Kim | 123/306 |
| 2006/0191254 A1* | 8/2006 | Bui et al. | 60/286 |
| 2007/0101703 A1 | 5/2007 | Kanaya et al. | |
| 2007/0144158 A1 | 6/2007 | Girard et al. | |
| 2007/0245718 A1* | 10/2007 | Cheng et al. | 60/286 |

FOREIGN PATENT DOCUMENTS

| | | |
|---|---|---|
| DE | 100 09 124 A1 | 8/2001 |
| EP | 1 770 253 A1 | 4/2007 |
| WO | WO 00/12202 | 3/2000 |

* cited by examiner

*Primary Examiner* — Kenneth Bomberg
*Assistant Examiner* — Brandon Lee
(74) *Attorney, Agent, or Firm* — McGlew and Tuttle, P.C.

(57) ABSTRACT

A flow guide (8) is provided for an exhaust system (3) of an internal combustion engine (1), especially in a motor vehicle. The flow guide (8) has at least one U-shaped guide plate body (13), which can be mounted with its U-base (14) on a pipe section (4') of the exhaust system (3) and whose U-legs (15) form in the mounted state a flow guide plate (15) each. The flow guide plate cooperates with an exhaust gas stream (19) being guided in the pipe section (4') during the operation of the exhaust system (3).

16 Claims, 3 Drawing Sheets

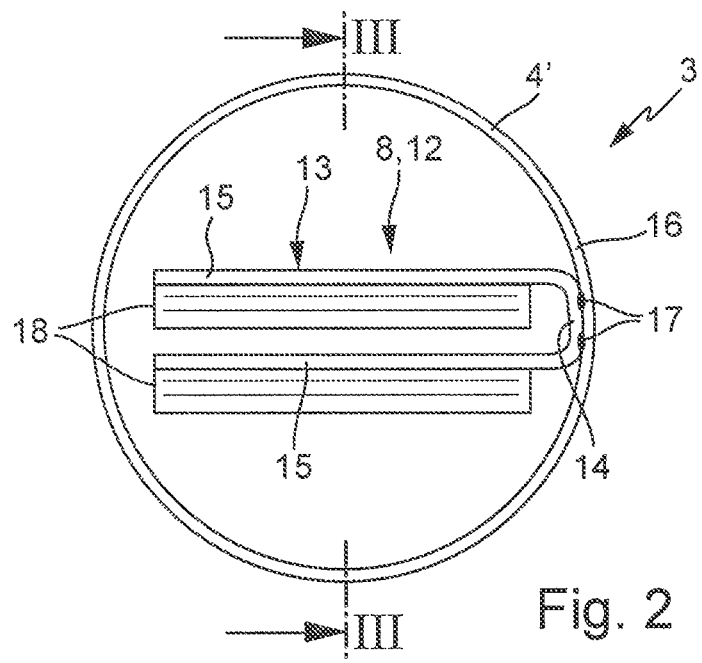
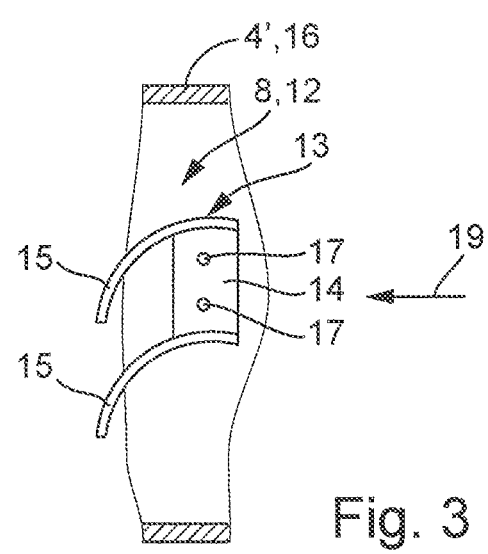

FLOW GUIDE DEVICE AS WELL AS EXHAUST SYSTEM EQUIPPED THEREWITH

CROSS REFERENCE TO RELATED APPLICATIONS

This application claims the benefit of priority under 35 U.S.C. §119 of German Patent Application DE 10 2007 035 226.5 filed Jul. 25, 2007, the entire contents of which are incorporated herein by reference.

FIELD OF THE INVENTION

The present invention pertains to a flow guide means for an exhaust system of an internal combustion engine, especially in a motor vehicle. The present invention pertains, in addition, to an exhaust system equipped with such a flow guide means for an internal combustion engine, especially in a motor vehicle.

BACKGROUND OF THE INVENTION

It may be necessary in exhaust systems of internal combustion engines for various reasons to guide or direct an exhaust gas stream within an exhaust gas path in a specific manner. For example, a dead water area in the area of a curve or bend of the exhaust gas path can thus be reduced. Furthermore, a more uniform flow distribution can be achieved in the expanded cross section by generating a swirl upstream of a cross section expansion. Furthermore, it may be necessary for various reasons to inject a liquid educt into the exhaust gas stream. For example, fuel may be injected into the exhaust gas stream upstream of an oxidation catalyst in order to induce an exothermic combustion reaction in an oxidation catalyst arranged downstream. Likewise, a reducing agent, for example, ammonia, may be injected, for example, into the exhaust gas stream in order to reduce nitrogen oxides entrained in the exhaust gas in an SCR catalytic converter arranged downstream. It is also possible to inject an aqueous ammonia solution into the exhaust gas stream instead of ammonia. Ammonia and water are then formed from the urea-water solution by a hydrolytic reaction. Furthermore, a fuel or another suitable reducing agent may be injected into the exhaust gas stream upstream of an NOX storage catalyst in order to regenerate the NOX storage catalyst.

To improve or make possible the mode of action of the educt injected in the liquid form into the exhaust gas line, extensive evaporation is just as desirable as an intensive mixing with the exhaust gas, in order to thus obtain the most homogeneous exhaust gas-educt mixture possible. The exhaust system may be equipped for this with a flow guide means, which is arranged in the exhaust gas line downstream of the injection means and is designed in a suitable manner as a mixing and/or evaporating means.

SUMMARY OF THE INVENTION

The present invention deals with the problem of proposing an improved embodiment for a flow guide means or for an exhaust system equipped therewith, which embodiment is characterized especially by inexpensive manufacturability. In addition, simplified adaptation to different installation situations shall preferably be made possible.

According to the present invention, a flow guide is provided comprising at least one U-shaped guide plate body with U-legs that form flow guide plates extending into the exhaust gas stream and with a U-base used to mount the guide plate body in the exhaust system. The particular guide plate body thus has a very simple and hence inexpensive design. The particular guide plate body can be fastened with the U-base to differently contoured sections of the exhaust system in a comparatively simple manner.

According to a preferred embodiment the particular guide plate body is manufactured from a single material piece, especially from a single piece of sheet metal. The guide plate body is thus a shaped sheet metal part, which can be manufactured at an especially low cost.

The particular guide plate body can be fastened with its U-base either directly to a pipe section of the exhaust system or indirectly via a pipe body, which forms a separately manufactured component in respect to the pipe section of the exhaust system. The particular guide plate body is installed in this pipe body and is firmly connected thereto. In conjunction with this pipe body, the flow guide means forms a unit that can be completely preassembled and can be installed in the preassembled state in the particular pipe section of the exhaust system.

Parallel deflecting blades, which support deflection of the flow in the area of a pipe bend or the like, can be formed in the exhaust system by means of the guide plate body. Furthermore, a swirl generator or a mixer or an evaporator or any desired combination of swirl generator, mixer and evaporator can be embodied with a plurality of guide plate bodies in the exhaust system. The individual guide plate bodies may be arranged in a common axial section distributed in the circumferential direction. It is equally possible to arrange the individual guide plate bodies axially one after the other and offset in relation to one another in the circumferential direction.

It is apparent that the above-mentioned features, which will also be explained below, are applicable not only in the particular combination described, but in other combinations or alone as well, without going beyond the scope of the present invention.

Preferred exemplary embodiments of the present invention are shown in the drawings and will be explained in more detail in the following description, where identical reference numbers refer to identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a cross sectional schematic view of the exhaust system in the area of a flow guide means corresponding to section lines II in FIG. 1;

FIG. 3 is a longitudinal sectional schematic view of the exhaust system in the area of the flow guide means corresponding to section line III in FIG. 2;

DESCRIPTION OF THE PREFERRED EMBODIMENTS

Figure 1:
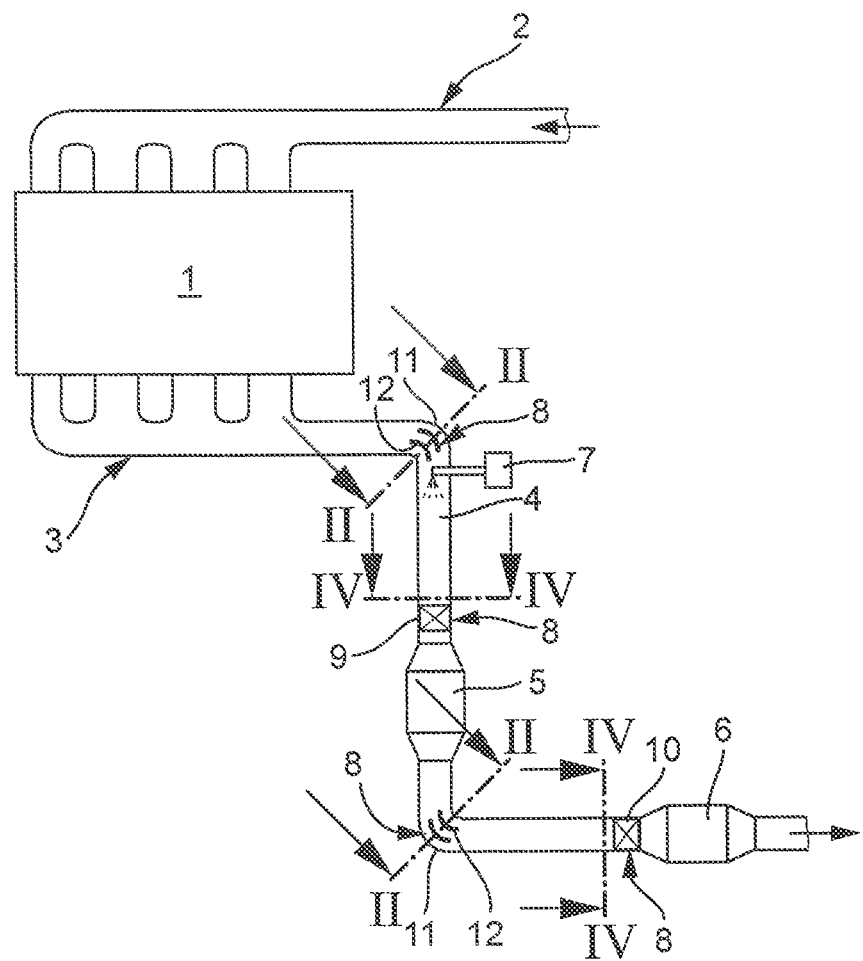
FIG. 1 is a greatly simplified, circuit diagram-like schematic view of an exhaust system according to the invention.

Referring to the drawings in particular, FIG. 1 shows an internal combustion engine 1 that may be equipped in the usual manner with a fresh gas unit 2 for supplying with fresh gas, e.g., air. An exhaust system 3 according to the invention is provided for removing exhaust gas. The internal combustion engine 1 is preferably arranged, together with the fresh gas unit 2 and with the exhaust system 3, in a motor vehicle. The exhaust system 3 comprises an exhaust gas pipe 4, into which a plurality of exhaust gas treating means can be connected. In the example being shown, the exhaust system 3 contains, for example, an SCR catalytic converter 5 and, downstream thereof, a particle filter 6. An injection means 7, by means of which a suitable reducing agent can be introduced into the exhaust gas stream upstream of the SCR catalytic converter 5, is arranged here upstream of the SCR catalytic converter 5. For example, ammonia or urea or an aqueous urea solution can be injected into the exhaust gas by means of the injection means 7. The injection is carried out in the liquid form, so that evaporation of the liquid educt will first take place in the exhaust gas. Furthermore, homogenization of the educt-exhaust gas mixture is necessary. To improve the evaporation of the liquid educt as well as the mixing between the educt and the exhaust gas, the exhaust system 3 has, downstream of the injection means 7 and upstream of the SCR catalytic converter 5, a flow guide means 8, which is designed as a mixing and/or evaporating means.

Another flow guide means, which may be designed, for example, as a swirl generator 10, is arranged directly upstream of the particle filter 6 in the example being shown. The swirl generator 10 generates in the stream a swirl, which brings about at the inlet of the particle filter 6 an expansion of the flow corresponding to the expanding flow cross section in the particle filter 6. A mixing and/or evaporating means 9 may, in principle, also contain such a swirl generator function.

Furthermore, the exhaust system being shown here has two 90° bends or 90° quadrant pipes 11. To reduce dead water areas located downstream in the area of these bends 11, the exhaust system 3 may likewise contain another flow guide means 8 each, which are designed as deflecting means 12.

Figure 4:
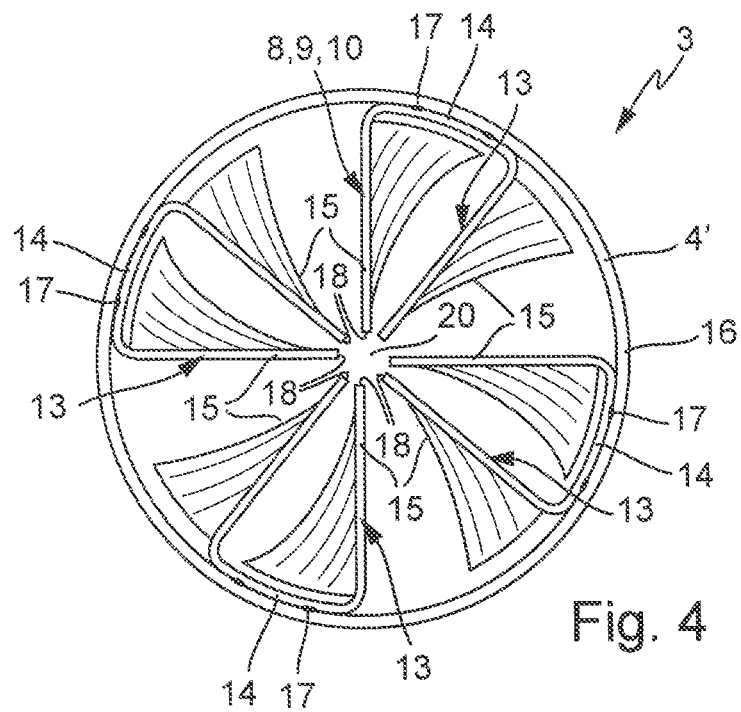
FIG. 4 is a cross sectional schematic view of the exhaust system in the area of another flow guide means corresponding to section lines IV in FIG. 1.

Corresponding to FIGS. 2 through 4, such a flow guide means 8 comprises at least one U-shaped guide plate body 13 each. The embodiment of the flow guide means 8 shown in FIGS. 2 and 3 has, for example, only a single such guide plate body 13. This embodiment may be, for example, the deflecting means 12. Contrary to this, the embodiment shown in FIG. 4 has four such guide plate bodies 13. It is clear that the flow guide means 8 may also have more or fewer than four such guide plate bodies 13. The embodiment shown in FIG. 4 may be used as a mixer and as an evaporator or as a mixer and/or evaporating means 9 and as a swirl generator 10.

Corresponding to FIGS. 2 through 6, the particular guide plate body 13 has a U-base 14 and two U legs 15. The legs 15 are connected to one another via their base 14. The base 14 is used to mount the guide plate body 13 on a pipe section 4' of the exhaust gas pipe 4 of the exhaust system 3. The particular guide plate body 13 with its base 14 may be fastened directly to the pipe section 4'. It is also possible for the flow guide means 8 to have a pipe body 16, which can be manufactured separately from the rest of the exhaust system 3 and to which the particular guide plate body 13 is fastened directly by means of its base 14 and which can be inserted into the exhaust system 3 in a suitable manner. For example, a unit, which can be completely preassembled and which can be installed in the corresponding pipe section 4' of the exhaust system 3, is created for this by means of the pipe body 16 by installing at least one guide plate body 13.

The legs 15 form a flow guide plate each, which will likewise be designated by 15 below. During the operation of the exhaust system 3, i.e., during the operation of the internal combustion engine 1, the particular flow guide plate 15 cooperates with an exhaust gas stream, which is guided in the particular pipe section 4' or in the pipe body 16.

The particular guide plate body 13 is preferably manufactured from a single piece. Furthermore, the particular guide plate body 13 is a shaped sheet metal part. Consequently, the particular guide plate body 13 is manufactured especially from a single piece of sheet metal.

Reliable fastening of the particular guide plate body 13 to the pipe section 4' or to the pipe body 16 is brought about, for example, by at least one welded connection 17. The particular welded connection 17 may be prepared, for example, by resistance welding. Corresponding welded spots for flow concentration may be formed integrally on the base 14, for example, by means of an embossing operation. The particular welded connection 17 may also be in the form of tack welds or weld spots. Furthermore, it is also possible to perform slot welding, in which the particular pipe section 4' or pipe body 16 contains, in the area of the base 14, an opening, which can be completely closed by the base 14 and along the edge of which a weld seam can be prepared to connect the base 14 to the pipe section 4' or to the pipe body 16. As an alternative, it is also possible, in principle, to crimp, screw, solder or rivet the base 14 with the pipe section 4' or with the pipe body 16.

The particular guide plate body 13 is preferably dimensioned or arranged in respect to the pipe body 16 or in respect to the pipe section 4' such that the flow guide plates 15 end in a stand-alone manner in the pipe section 4' or in the pipe body 16. The stand-alone ends are designated by 18 in FIGS. 2 and 4.

In the embodiment shown in FIGS. 2 and 3, the flow guide plates 15 in the pipe body 16 or in the pipe section 4' form a deflecting blade pair, which is parallel in itself, in order to thus embody the desired deflecting means 12. Only a single guide plate body 13 is used for this in the example. An embodiment in which two or more such guide plate bodies 13 are used to form more than two deflecting blades, which are parallel to one another, is also possible, in principle. The individual guide plate bodies 13 may be arranged within the same axial section of the pipe section 4' or in the pipe body 16. It is likewise possible to arrange the individual guide plate bodies 13 opposite one another in the direction of flow in the pipe section 4' or in the pipe body 16.

A plurality of guide plate bodies 13, namely, four such guide plate bodies in a purely exemplary manner, are provided in the embodiment shown in FIG. 4. These are arranged in the pipe body 16 or in the pipe section 4' such that the individual flow guide plates 15 are arranged in a star-shaped pattern in relation to one another. The individual guide plate bodies 13 are arranged in the example in the same axial area of the pipe section 4' or pipe body 16, namely, offset in relation to one another in the circumferential direction. It is equally possible, in principle, to arrange individual guide plate bodies 13 or a plurality of such guide plate bodies 13 one after another in the axial direction and preferably offset in relation to one another in the circumferential direction.

Corresponding to FIGS. 2 through 4, the flow guide plates 15 have a guide profile in their respective cross sections. This profile may be directed in terms of the incoming flow in parallel to the exhaust gas stream, which is indicated by an arrow 19 in FIG. 3. As a result, the flow guide plates 15 have an especially low resistance to flow. The flow guide plates 15 have an angle of incidence in relation to the exhaust gas stream 19 on the discharge side, as a result of which the desired flow-guiding effect is achieved. The flow guide plates 15 have a constant profile each along their longitudinal direction extending at right angles to the exhaust gas stream 19 in the embodiment shown in FIGS. 2 and 3. The flow guide plates 15 have the same action as a result and form the desired deflecting blade pair. Contrary to this, the flow guide plates 15 in the embodiment shown in FIG. 4 have a varying incidence angle. They are directed, in principle, in parallel to the exhaust gas stream on the incoming flow side in this case as well. The discharge side incidence angle decreases here with increasing distance from the corresponding base 14. This means that the particular flow guide plate 15 generates a greater deflection of the exhaust gas stream in the circumferential direction radially on the outside than radially on the inside.

The transition from the incoming flow edge to the discharge edge with the maximum incidence angle is continuous or smooth at least in the example shown in FIG. 3. A stepped change in the angle of incidence is also conceivable, in principle.

A core area 20 of the cross section of the pipe body 16 or of the pipe section 4', through which flow is possible, is open in the embodiment shown in FIG. 4. This means that the flow guide plates 15 are smaller in the radial direction than the radius of the cross section through which flow is possible, which is circular in this example. In an alternative embodiment, the guide plate bodies 13 may be arranged in the pipe section 4' or in the pipe body 16 such that the core area 20 is opaque in the direction of flow. The flow guide plates 15 may be dimensioned larger for this in the radial direction. To avoid a mutual contact between the flow guide plates 15 in the area of their free ends 18, provisions may be made, for example, for the guide plate bodies 13 to be arranged axially one after the other in the pipe body 16 or in the pipe section 4.

Figure 5:
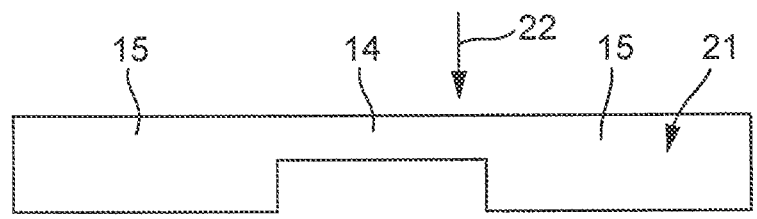
FIG. 5 is a top view of a sheet metal strip for manufacturing a guide plate body.
Figure 6:
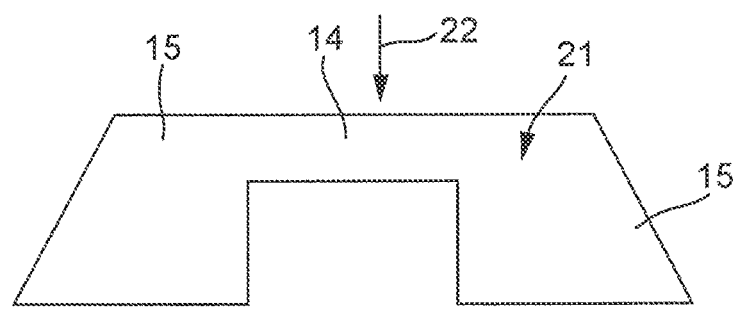
FIG. 6 is a top view of a sheet metal strip for manufacturing a guide plate body as in FIG. 5, but for another embodiment.

Corresponding to FIGS. 5 and 6, the guide plate bodies 13 can be manufactured from pieces of sheet metal 21. FIGS. 5 and 6 show the corresponding sheet metal 21 in a cut-out, but not yet deformed state for two different embodiments of the guide plate bodies 13. The base 14 and the two legs 15 can be recognized. For example, the legs 15 may have a greater depth in the direction of flow indicated by an arrow 22 than the corresponding base 14, which connects the two legs 15 to one another. FIG. 5 shows sheet metal 21, which can be used, for example, to manufacture the guide plate body 13 shown in FIG. 2. Contrary to this, FIG. 6 shows another embodiment for such sheet metal 21, which can be used, for example, to manufacture a guide plate body 13 used in FIG. 4.

While specific embodiments of the invention have been shown and described in detail to illustrate the application of the principles of the invention, it will be understood that the invention may be embodied otherwise without departing from such principles.

What is claimed is:

1. A flow guide for an exhaust system of an internal combustion engine, the flow guide comprising:
    only a single U-shaped guide plate body including only a single U-base with a mounting surface for mounting on a pipe section of the exhaust system and with only two U-legs extending away from said mounting surface, each of said U-legs defining a flow guide plate, each said flow guide plate cooperating with an exhaust gas stream in the pipe section for guiding the exhaust gas stream in the pipe section during operation of the exhaust system, wherein:
    said U-shaped guide plate body is manufactured from a single piece of material;
    said single piece of material is a single piece of sheet metal; and
    each said flow guide plate has a guide profile, which is directed in parallel to a direction of said exhaust gas stream on an incoming flow side and which has an angle of incidence in relation to said direction of said exhaust gas stream on a discharge side.

2. A flow guide in accordance with claim 1, wherein:
    each said flow guide plate has a constant profile along a longitudinal direction extending at right angles to a direction of said exhaust gas stream.

3. A flow guide in accordance with claim 1, further comprising a pipe body having a curved inner surface, said U-shaped guide plate body mounting surface being curved in a direction and path corresponding to said pipe body curved inner surface and being fastened to said pipe body curved inner surface, said pipe body with said U-shaped guide plate body fastened thereto being insertable into or forming the pipe section of the exhaust system.

4. A flow guide in accordance with claim 3, wherein at least one of:
    said U-shaped guide plate body is arranged in said pipe body such that said flow guide plates end in a stand-alone manner; and
    said flow guide plates form in said pipe body a deflecting blade pair, which is parallel in itself; and
    a plurality of said guide plate bodies are arranged in said pipe body such that said flow guide plates are arranged in a star-shaped pattern in relation to one another; and
    a plurality of said guide plate bodies are arranged in said pipe body to form a swirl generator and/or mixer and/or evaporator; and
    a plurality of said guide plate bodies are arranged in said pipe body with respective flow guide plates forming a core area which is opaque in said direction of flow, in a cross section of said pipe body; and
    said U-shaped guide plate body is fastened with a base thereof to the pipe body by resistance welding, tack welds, spot welding, slot welding, soldering or crimping.

5. A flow guide in accordance with claim 1, wherein each said flow guide plate has a greater depth in a direction of flow than said U-base.

6. A flow guide in accordance with claim 1, wherein:
    each said flow guide plate has a profile with a varying angle of incidence along a longitudinal direction extending at right angles to a direction of said exhaust gas stream.

7. A flow guide in accordance with claim 6, wherein:
    said varying angle of incidence decreases with an increasing distance from said U-base.

8. An exhaust system for a vehicle internal combustion engine, the exhaust system comprising:
    a flow guide comprising a U-shaped guide plate body comprising only one U-base mounting surface positioned between only two U-legs extending away from said U-base mounting surface, each of said U-legs defining a flow guide plate; and
    an exhaust system pipe section with an inner pipe section surface, said flow guide being mounted with said mounting surface of said U-base on said inner pipe section surface of said exhaust system pipe section, each of said flow guide plates cooperating with an exhaust gas stream guided in said exhaust system pipe section during operation of the exhaust system, wherein:

each said U-shaped guide plate body is manufactured from a single piece of material;

said single piece of material is a single piece of sheet metal; and each said flow guide plate has a guide profile, which is directed in parallel to a direction of said exhaust gas stream on an incoming flow side and which has an angle of incidence in relation to said direction of said exhaust gas stream on a discharge side.

9. An exhaust system in accordance with claim 8, wherein:

each said flow guide plate has a constant profile along a longitudinal direction extending at right angles to a direction of said exhaust gas stream.

10. An exhaust system in accordance with claim 8, wherein:

each said flow guide plate has a profile with a varying angle of incidence along a longitudinal direction extending at right angles to a direction of said exhaust gas stream.

11. An exhaust system in accordance with claim 10, wherein:

said angle of incidence decreases with an increasing distance from said U-base.

12. An exhaust system in accordance with claim 8, wherein each said flow guide plate has a greater depth in a direction of flow than said U-base.

13. An exhaust system in accordance with claim 8, wherein said exhaust system pipe section comprises a pipe body having said inner pipe section surface as a curved inner surface, said mounting surface of said U-shaped guide plate body being curved in a direction corresponding to said curved inner surface of the said pipe body and with a curve contour shaped corresponding to said curved inner surface of the said pipe body and being fastened to said curved inner surface of said pipe body.

14. An exhaust system in accordance with claim 13, wherein at least one of:

said U-shaped guide plate body is arranged in said pipe body such that said flow guide plates end in a stand-alone manner; and said flow guide plates form in said pipe body a deflecting blade pair, which is parallel in itself; and a plurality of said guide plate bodies are arranged in said pipe body such that said flow guide plates are arranged in a star-shaped pattern in relation to one another; and a plurality of said guide plate bodies are arranged in said pipe body to form a swirl generator and/or mixer and/or evaporator; and a plurality of said guide plate bodies are arranged in said pipe body with respective said flow guide plates forming a core area which is opaque in said direction of flow, in a cross section of said pipe body; and said U-shaped guide plate body is fastened with a base thereof to the pipe body by resistance welding, tack welds, spot welding, slot welding, soldering or crimping.

15. An exhaust system for a vehicle internal combustion engine, the exhaust system comprising:

a flow guide comprising a U-shaped guide plate body comprising only one U-base mounting surface positioned between only two U-legs extending away from said U-base mounting surface, each of said U-legs defining a flow guide plate, said U-shaped guide plate body consisting of a single piece of sheet metal material; and an exhaust system pipe section with an inner pipe section surface, said flow guide being mounted with said mounting surface of said U-base on said inner pipe section surface of said exhaust system pipe section, each of said flow guide plates cooperating with an exhaust gas stream guided in said exhaust system pipe section during operation of the exhaust system, wherein:

said inner pipe section surface has an inner pipe section surface contour;

said mounting surface of said U-base has a contour corresponding to said inner pipe section surface contour; and each said flow guide plate has a guide profile, which is directed in parallel to a direction of said exhaust gas stream on an incoming flow side and which has an angle of incidence in relation to said direction of said exhaust gas stream on a discharge side.

16. An exhaust system in accordance with claim 15, wherein said inner pipe section surface is curved and said U-base has a contour curved in a direction corresponding to said inner pipe section surface and with a curve contour shaped corresponding to said inner pipe section surface.

* * * * *